United States Patent [19]

Taniguchi et al.

[11] Patent Number: 4,589,731
[45] Date of Patent: May 20, 1986

[54] LIGHT-SHIELDING COVER FOR SHEET-LIKE LIGHT GUIDE MEMBER

[75] Inventors: Yutaka Taniguchi; Hisatoyo Kato, both of Kanagawa, Japan

[73] Assignee: Fuji Photo Film Co., Ltd., Kanagawa, Japan

[21] Appl. No.: 534,856

[22] Filed: Sep. 22, 1983

[30] Foreign Application Priority Data

Sep. 27, 1982 [JP] Japan .................. 57-168139

[51] Int. Cl.$^4$ .......................... G02B 5/14; G02B 7/00
[52] U.S. Cl. ................................. 350/319; 350/321; 350/96.23; 350/96.1; 250/327.2
[58] Field of Search .............. 350/319, 321, 96.10, 350/96.23, 582, 589; 250/372.2

[56] References Cited

U.S. PATENT DOCUMENTS

| 4,317,615 | 3/1982 | Herold ..................... 350/96.1 |
| 4,346,295 | 8/1982 | Tanaka et al. ............. 250/327.2 |
| 4,439,866 | 3/1984 | Kato et al. ............... 250/327.2 |
| 4,484,073 | 11/1984 | Ohara et al. ............. 250/327.2 |

Primary Examiner—Jon W. Henry
Attorney, Agent, or Firm—Sughrue, Mion, Zinn, Macpeak and Seas

[57] ABSTRACT

A light-shielding cover for a light guide member guiding light emitted from a stimulable phosphor sheet carrying a radiation image stored therein when the stimulable phosphor sheet is exposed to stimulating rays comprises a flexible light-shielding member for covering the whole of the side faces of the light guide member without closely contacting the side faces, and a pair of rod-like core metal members fitted to the flexible light-shielding member for sandwiching a portion near a linear light input face of the light guide member from both sides thereof.

5 Claims, 6 Drawing Figures

LIGHT-SHIELDING COVER FOR SHEET-LIKE LIGHT GUIDE MEMBER

BACKGROUND OF THE INVENTION

1. Field of the Invention

This invention relates to a light shielding cover for a sheet-like light guide member for guiding light, which is emitted from a stimulable phosphor sheet carrying a radiation image stored therein when the stimulable phosphor sheet is exposed to stimulating rays such as laser beams, to a photodetector.

2. Description of the Prior Art

When certain kinds of phosphors are exposed to a radiation such as X-rays, α-rays, β-rays, γ-rays or ultraviolet rays, they store a part of the energy of the radiation. Then, when the phosphor which has been exposed to the radiation is exposed to stimulating rays such as visible light, light is emitted from the phosphor in proportion to the stored energy of the radiation. A phosphor exhibiting such properties is referred to as a stimulable phosphor.

As disclosed in U.S. Pat. No. 4,258,264 and Japanese Unexamined Patent Publication No. 56(1981)-11395, it has been proposed to use a stimulable phosphor in a radiation image recording and read-out system. Specifically, the stimulable phosphor formed on a sheet is first exposed to a radiation passing through an object to have a radiation image stored therein, and is then scanned with stimulating rays such as laser beam which causes it to emit light in the pattern of the stored image. The light emitted from the stimulable phosphor sheet upon stimulation thereof is photo-electrically detected and converted to an electric image signals which is processed as desired to reproduce a visible image on a recording medium such as a photographic light-sensitive material or on a display device such as a cathode ray tube (CRT).

Since the light emitted from the stimulable phosphor is non-directional and weak, it is necessary to increase the light guiding efficiency by enlarging the light-receiving solid angle as much as possible so as to catch more light. If the light guiding efficiency is low, the signal-to-noise ratio becomes low and, in the worst case, it becomes impossible to obtain a signal from the light.

As described in U.S. Pat. No. 4,346,295, it has been proposed to position a sheet-like light guide member made of a light-guiding sheet material between a stimulable phosphor sheet and a photodetector for detecting the light emitted from the stimulable phosphor sheet in such a manner that one end face of the light guide member is positioned close to the scanning line on the stimulable phosphor sheet, and the other end, which is formed to match the shape of the light receiving face of the photodetector, is closely contacted with the light receiving face, thereby to increase the light guiding efficiency and improve the signal-to-noise ratio.

The sheet-like light guide member is made of a transparent thermoplastic resin sheet such as an acrylic resin sheet so that the light entering from the light input face can be transmitted to the light output face by total reflection through the interior of the light guide member. The light emitted from the stimulable phosphor sheet when the phosphor sheet is exposed to stimulating rays is guided in the interior of the light guide member, emitted from the light output face of the light guide member and received by the photodetector. Preferred shapes and materials of the light guide member are described in U.S. Pat. No. 4,346,295.

When the sheet-like light guide member as mentioned above is used, it is possible to detect the light emitted from the stimulable phosphor when the stimulable phosphor is exposed to stimulating rays at a very high light guiding efficiency. However, it has been found that light emitted from portions of the stimulable phosphor sheet outside the scanning portion of stimulating rays also enters the sheet-like light guide member and, as a result, the signal-to-noise ratio of the obtained image signal is decreased. The light emitted from portions outside the scanning portion of stimulating rays includes the following:

(1) light emitted from portions of the stimulable phosphor sheet outside the scanning portion when stimulating rays entering the sheet-like light guide member together with the light emitted from the stimulable phosphor sheet leak from the light guide member before the stimulating rays go to the light output face of the light guide member, and excite the aforesaid portions of the stimulable phosphor sheet to emit light, and (2) light emitted from portions of the stimulable phosphor sheet outside the scanning portion when the stimulating rays reflected from the stimulable phosphor sheet and then reflected from the light input face of the sheet-like light guide member excite the aforesaid portion of the stimulable phosphor sheet to emit light.

Further, it has been proposed in commonly assigned U.S. Patent Appln. Ser. No. 434,886 to employ a method wherein, prior to final read-out for obtaining a visible image for viewing purposes, preliminary read-out for detecting the recording information stored in the stimulable phosphor sheet is conducted by use of stimulating rays having an intensity lower than the intensity of stimulating rays used in the final read-out, and final read-out conditions are determined based on the recording information obtained thereby. In general, this method is conducted by installing two light detecting means respectively comprising the sheet-like light guide members in a single read-out apparatus. In this case, since the sensitivity of the preliminary read-out system is generally several tens of times higher than the sensitivity of the final read-out system, the signal-to-noise ratio of the signal obtained in the preliminary read-out is markedly decreased if the light emitted from the stimulable phosphor sheet upon stimulation with the stimulating rays in the final read-out system enters the sheet-like light guide member of the preliminary read-out system. The light emitted from the stimulable phosphor sheet upon stimulation with the stimulating rays in the final read-out and directed into the sheet-like light guide member of the preliminary read-out system includes the following:

(1) light emitted from the stimulable phosphor sheet when the stimulating rays leaking from the sheet-like light guide member of the final read-out system excite the stimulable phosphor sheet in the final read-out to emit light, (2) light emitted from the stimulable phosphor sheet when the stimulating rays leaking from the sheet-like light guide member of the final read-out system excite the stimulable phosphor sheet in the preliminary read-out to emit light, and (3) a portion of the light emitted from the stimulable phosphor sheet by scanning thereof with the stimulating rays in the final read-out, which could not be caught by the sheet-like light guide member of the final read-out system.

Therefore, it is desired to shield the sheet-like light guide member from the light emitted from portions of the stimulable phosphor sheet outside the scanning portion of stimulating rays. However, when a light-shielding plate is used for this purpose, it constitutes an obstacle to the loading of the sheet-like light guide member on an apparatus and the unloading thereof from the apparatus. Further, if the sheet-like light guide member is coated with black paint, it becomes impossible for the light guide member to transmit light by total reflection. Accordingly, it is considered desirable to employ a light-shielding member covering the sheet-like light guide member in spaced relation thereto. However, as disclosed in U.S. Pat. No. 4,346,295, the sheet-like light guide member is made by heating and softening a transparent thermoplastic resin sheet such as an acrylic sheet while an end portion thereof is maintained in the flat form, rounding the other end portion of the sheet to a ring-like shape and clamping the portion, allowing the sheet to cool naturally, cutting both end portions of the sheet, and polishing the cut faces. Therefore, the shapes of the sheet-like light guide members thus made are not always the same, and fluctuation occurs particularly in the shape of the side face (as will be described later) and the linearity of the portion from the light input face to the light output face. Since the shapes of the respective sheet-like light guide members differ from one another, it is not always possible to shield the light guide members from light by use of moldings having a predetermined shape and made of plastics, metals, or the like. Particularly, it is difficult to shield the portion near the light input face from light. Further, the cost required for manufacture becomes very high.

SUMMARY OF THE INVENTION

The primary object of the present invention is to provide a light-shielding cover which is inexpensive and suitable for shielding sheet-like light guide members having shapes differing from one another.

Another object of the present invention is to provide a light-shielding cover which completely shields even the portion near the light input face of a sheet-like light guide member without adversely affecting the light guiding efficiency.

The light-shielding cover for a sheet-like light guide member in accordance with the present invention comprises a flexible light-shielding member for covering the whole of the side faces of the light guide member without closely contacting the side faces, and a pair of rod-like core metal members fitted to the flexible light-shielding member and capable of sandwiching a portion near the linear light input face of the light guide member from both sides thereof.

By "side faces of the light guide member" are meant portions of the surfaces of the light guide member other than the light input face and the light output face. By "covering without closely contacting the side faces" is meant that the light-shielding member optically contacts and covers the light guide member so that the efficiency of light guiding by total reflection in the light guide member is not markedly affected. Thus, the light-shielding member may be physically contacted with the light guide member insofar as the light guiding efficiency is not markedly affected. The flexible light-shielding member may be made of light-shielding cloth, for example, black nylon tuft cloth used for photographic dark bags or the like.

By "fitting" is meant fitting of any method insofar as the core metal members are fitted to the flexible light-shielding member. For example, the whole of the core metal members may be wrapped in the light-shielding member, or the core metal members may be bonded to the light-shielding member. Alternatively, the core metal members may be pressed against the light guide member from above the light-shielding member and secured thereto.

Since the light-shielding cover of the present invention comprises the flexible light-shielding member, it can completely cover the whole of the side faces of the sheet-like light guide member even when the shape of the light guide member changes, and is suitable as a light-shielding means for the light guide member. Further, since a portion near the light input face of the light guide member is sandwiched by a pair of rod-like core metal members fitted to the light-shielding member in the condition of linear contact wherein the contact area is small, light-shielding of the portion near the light input face can be effected sufficiently without adversely affecting the light guiding efficiency. Accordingly the light-shielding cover of the present invention is very suitable as a light-shielding means for the sheet-like light guide member for preventing the light emitted from the stimulable phosphor sheet from entering the light guide member from the side faces thereof, thereby to improve the signal-to-noise ratio of the image signal obtained. Further, since the light-shielding cover of the present invention can be made of the flexible light-shielding member such as cloth, and the core metal members, the light-shielding cover can be manufactured very inexpensively. The light-shielding cover of the present invention is advantageous also for protecting the sheet-like light guide member from dust and preventing the light guiding efficiency of the light guide member from decreasing due to dust.

DESCRIPTION OF THE PREFERRED EMBODIMENTS

The present invention will hereinbelow be described in further detail with reference to the accompanying drawings.

Figure 1A:
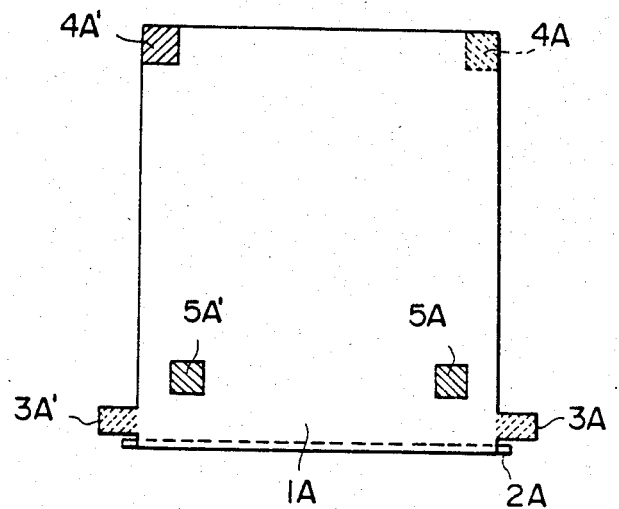
FIG. 1A and 1B are developed views showing an embodiment of the light-shielding cover in accordance with the present invention.
Figure 1B:
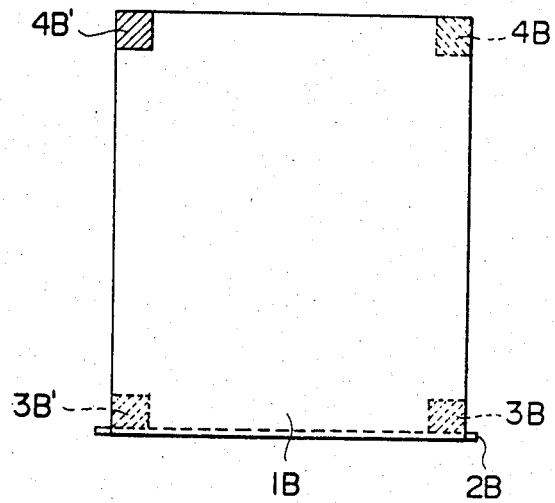

Referring to FIGS. 1A and 1B showing an embodiment of the light-shielding cover in accordance with the present invention, the light-shielding cover comprises a first rectangular light-shielding cover member 1A and a second rectangular light-shielding cover member 1B. To an end edge portion of the first light-shielding cover member 1A is fitted a rod-like core metal 2A. Protrusions 3A and 3A' are formed at the corner portions of the first light-shielding cover member 1A near the core metal 2A. The back surfaces of the protrusions 3A and 3A' are provided with flat fasteners (i.e. joining means based on engagement of fine fibrous protuberances with each other, which are generally called "magic tapes"). On the back surface of the corner portion opposite to the corner portion provided with the protrusion 3A is positioned a flat fastener 4A. On the front surface of the corner portion opposite to the corner portion provided with the protrusion 3A' is positioned a flat fastener 4A' for engagement with the flat fastener 4A. Further, flat fasteners 5A and 5A' for engagement with a belt for preventing the second light-shielding cover member 1B from drooping down are positioned on the front surface of the first light-shielding cover member 1A. A rod-like core metal 2B is fitted to an end edge portion of the second light-shielding cover member 1B. On the back surface of the corner portions of the second light-shielding cover member 1B near the core metal 2B are positioned flat fasteners 3B and 3B' for engagement with the flat fasteners of the protrusions 3A and 3A' of the first light-shielding cover member 1A. On the back surface of the corner portion opposite to the corner portion provided with the flat fastener 3B is positioned a flat fastener 4B. On the front surface of the corner portion opposite to the corner portion provided with the flat fastener 3B' is positioned a flat fastener 4B' for engagement with the flat fastener 4B.

The method of mounting the light-shielding cover members 1A and 1B on a sheet-like light guide member will now be described below with reference to FIGS. 2A and 2B.

Figure 2A:
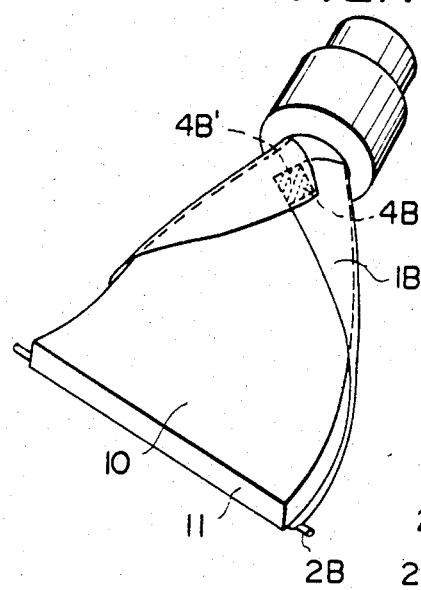
FIG. 2A and 2B are explanatory views showing the method of mounting the light-shielding cover of FIGS. 1A and 1B on a sheet-like light guide member.
Figure 2B:
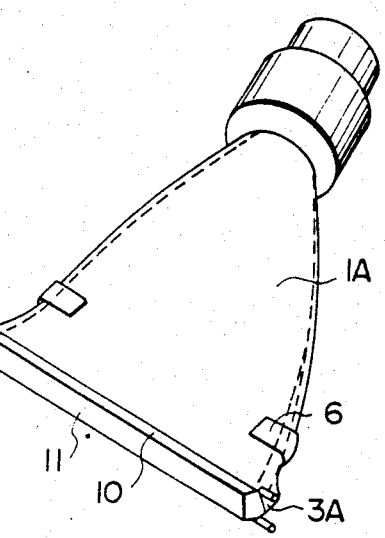

As shown in FIG. 2A, the second light-shielding cover member 1B is secured to the sheet-like light guide member 10 from the back side thereof by wrapping a part of the second light-shielding cover member 1B around a portion of the light guide member 10 near the light output face by use of the flat fasteners 4B and 4B' so that the end edge portion of the second light-shielding cover member 1B provided with the core metal 2B is positioned at a point spaced slightly (normally by 2 to 5 mm) from the light input face 11 of the light guide member 10. Then, the first light-shielding cover member 1A is secured to the light guide member 10 from the front side thereof by engaging the flat fasteners 4A and 4A' with each other and by engaging the flat fasteners at the protrusions 3A and 3A' with the flat fasteners 3B and 3B' of the second light-shielding cover member 1B so that the end edge portion of the first light-shielding cover member 1A provided with the core metal 2A is positioned at a point spaced from the light input face 11 by the same distance as the space between the end edge portion of the second light-shielding cover member 1B provided with the core metal 2B and the light input face 11. This step is conducted so that the core metals 2A and 2B sandwich a portion near the light input face 11 from both sides thereof by linear contact at an appropriate stress. In this case, it becomes possible to shield the portion near the light input face 11 without adversely affecting the light guiding efficiency. Thereafter, a belt 6 for preventing the second light-shielding cover member 1B from drooping down from the back side of the light guide member 10 is mounted by use of the flat fasteners 5A and 5A' of the first light-shielding cover member 1A. In this manner, the light-shielding cover of the present invention is mounted on the light guide member 10.

Figure 3A:
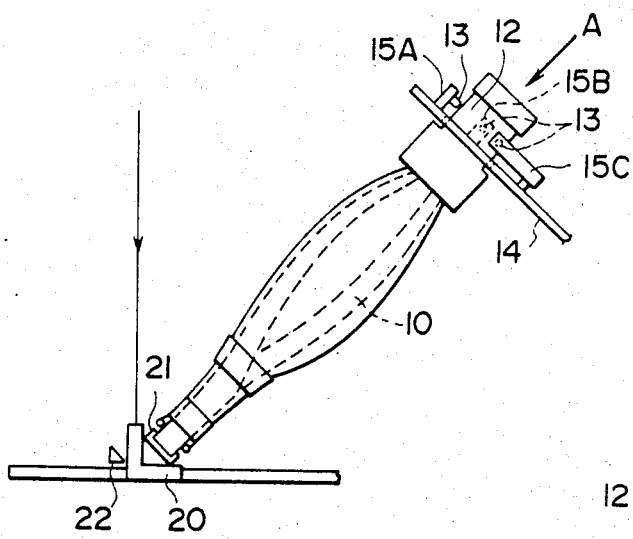
FIGS. 3A and 3B are schematic views showing the condition of mounting the sheet-like light guide member shielded from light by the light-shielding cover in accordance with the present invention in a read-out apparatus.
Figure 3B:
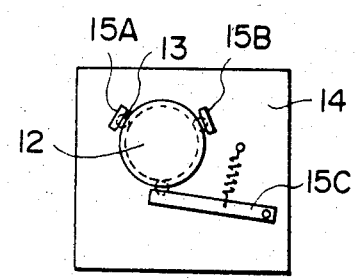

FIGS. 3A and 3B show the condition of mounting the sheet-like light guide member shielded from light by the light-shielding cover of the present invention in a read-out apparatus.

In FIG. 3A, the light input face of the light guide member 10 is supported by a supporting member 20 of the type as described in Japanese Unexamined Patent Publication No. 58(1983)-142284 so that the light guiding efficiency is always the same even when there is a fluctuation in the light guide members. At the portion of the light input face of the light guide member 10 contacted with the supporting member 20, a protector 21 made of a wear-resistant material such as metal is provided to prevent the light input face of the light guide member 10 from being damaged by the supporting member 20. On the other hand, instead of directly fixing the light output face of the light guide member 10 or a photodetector 12 closely contacted with the light output face, the periphery of the photodetector 12 should preferably be held by three rotatable balls 13. The balls 13 are rotatably contained in ball cases 15A, 15B and 15C secured to a supporting means 14 which is fixed to the read-out apparatus. However, the ball case 15C is rotatably mounted on the supporting means 14 and urged towards the center of the photodetector 12. FIG. 3B shows the mounting condition as viewed in the direction of the arrow A in FIG. 3A. When the light guide member 10 is mounted as described above, it is possible to support the light input face of the light guide member 10 always in a stable manner by the supporting member 20 even when the length of the light guide member 10 changes due to a change of temperature. When a light-shielding member 22 for shielding the stimulating rays reflected from the light input face is positioned as shown in FIG. 3A, it is possible to further increase the signal-to-noise ratio of the image signal obtained from the light emitted from the stimulable phosphor sheet.

It should be understood that the present invention can be embodied in various ways other than the above described embodiment. For example, it is also possible to wrap a single light-shielding member around the light guide member.

We claim:

1. A light-shielding device comprising: a sheet-like light guide member made of a sheet-like transparent material so as to have a linear light input face and used for guiding light, which is emitted along a scanning line of stimulating rays from a stimulable phosphor sheet carrying a radiation image stored therein when said stimulable phosphor sheet is scanned with said stimulating rays, from said light input face to a light output face, a light-shielding cover comprising a flexible light-shielding member for covering the whole of the side faces of said sheet-like light guide member without closely contacting said side faces, and a pair of rod-like core metal members fitted to said flexible light-shielding member and sandwiching a portion near said linear light input face of said sheet-like guide member from both sides thereof.

2. A light-shielding cover as defined in claim 1 wherein said flexible light-shielding member comprises two rectangular light-shielding cover members capable of being secured to said sheet-like light guide member from the front side and the back side thereof.

3. A light-shielding cover as defined in claim 2 wherein said rectangular light-shielding cover members are provided with flat fasteners at corner portions thereof.

4. A light-shielding cover as defined in claim 3 wherein one of said rectangular light-shielding cover members is provided with flat fasteners also in positions near two corner portions for engagement with a belt-like means for preventing the other rectangular light-shielding cover member from drooping down from said sheet-like light guide member.

5. A light-shielding cover as defined in claim 4 wherein said two corner portions have protrusions provided with flat fasteners for engagement with the flat fasteners of said other rectangular light-shielding cover member.

* * * * *